United States Patent [19]

Hatakeyama

[11] 4,124,202
[45] Nov. 7, 1978

[54] GAS SPRING
[75] Inventor: Susumu Hatakeyama, Yokohama, Japan
[73] Assignee: Tokico Ltd., Kanagawa, Japan
[21] Appl. No.: 799,313
[22] Filed: May 23, 1977
[30] Foreign Application Priority Data
May 28, 1976 [JP] Japan ............................ 51-68738[U]
[51] Int. Cl.² ............................................. F16F 9/32
[52] U.S. Cl. .................................. 267/118; 188/300; 248/400; 267/131
[58] Field of Search ..................... 267/64 R, 113, 117, 267/118, 124, 131; 188/299, 300; 108/144, 145; 248/354 H, 400; 74/102, 103

[56] References Cited
U.S. PATENT DOCUMENTS

| | | | |
|---|---|---|---|
| 3,711,054 | 1/1973 | Bauer | 248/400 |
| 3,787,019 | 1/1974 | Freitag | 248/400 |
| 3,913,901 | 10/1975 | Molders | 248/400 |
| 3,921,952 | 11/1975 | Wirges | 248/400 |
| 3,930,565 | 1/1976 | Scheben et al. | 188/300 |

Primary Examiner—Edward R. Kazenske
Attorney, Agent, or Firm—Wenderoth, Lind & Ponack

[57] ABSTRACT

A gas spring includes a cylinder receiving pressurized gas and liquid therein, a piston slidably disposed in the cylinder, a piston rod secured to the piston and extending to the outside of the cylinder through a first end thereof, a valve mechanism disposed in the cylinder for controlling movement of the fluid in the cylinder, thereby controlling movement of the piston in the cylinder, and a valve actuating element projecting to the outside of the cylinder through a second end thereof. The cylinder has a generally cylindrical portion extending from the second end thereof, and a valve operating member is pivotally supported on the extending portion of the cylinder.

1 Claim, 4 Drawing Figures

U.S. Patent  Nov. 7, 1978  4,124,202
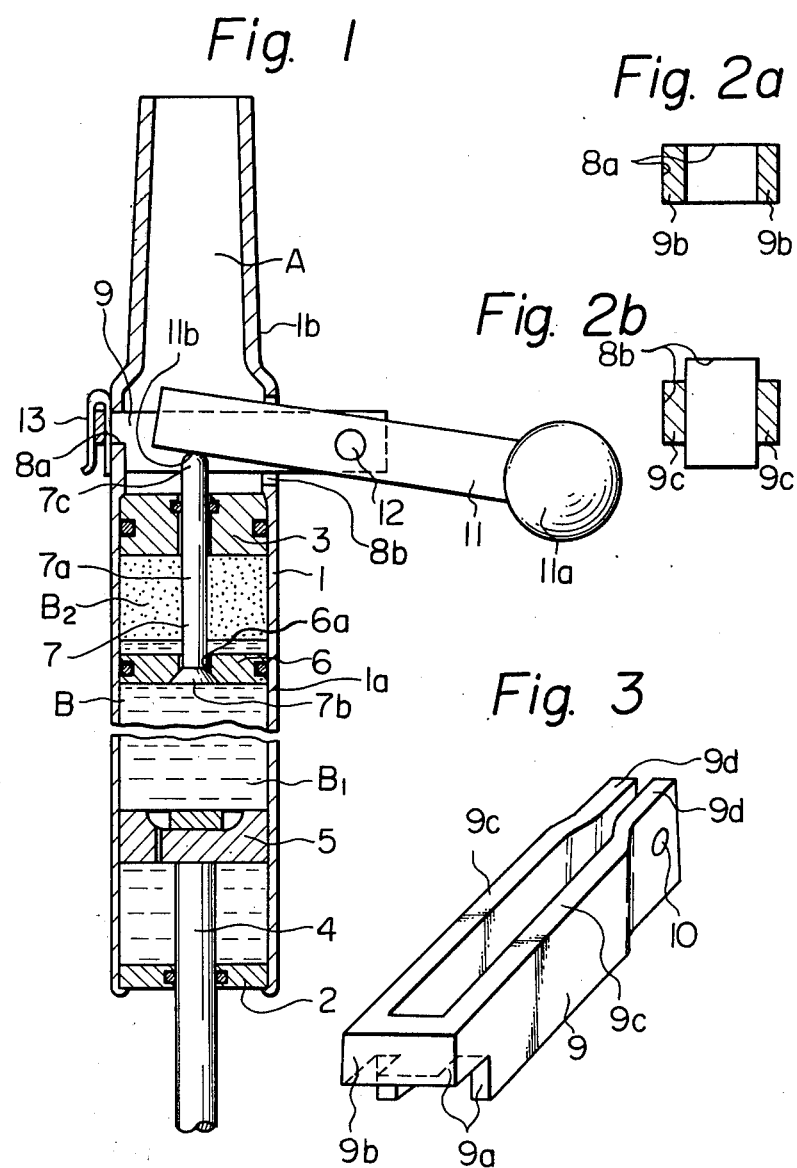

GAS SPRING

BACKGROUND OF THE INVENTION

This invention relates to gas springs for use in articles such as chairs, beds or the like, and particularly, to a gas spring of the type having an actuating device for adjusting the overall length of the gas spring to adjust the height of the chairs or beds.

Usually, the main body portion of gas spring is mounted on a supported member such as a seat portion of a chair and a piston rod of the gas spring is mounted on or engages with a supporting member such as a base portion of the chair, and the actuating device is mounted on the supported member separately from the gas spring. A valve actuated by the actuating device is mounted directly on the main body portion of the gas spring with an actuated end projecting outward of the main body portion for engaging with an actuating end of the actuating device.

Thus, since the main body of the gas spring and the actuating device are mounted separately on the supported member, it has been difficult to obtain a proper alignment therebetween and to obtain a proper relative position between the actuating end of the actuating device and the actuated end of the valve. When the actuating device and the actuated end such as a projecting end of a valve stem are not aligned properly or are positioned offset relative to the direction of the movement of the valve, either or both of the valve and the actuating device will wear unevenly and slantingly during a long period of use thereby causing a bending force on the valve or a lever of the actuating device and resulting operational failure. When a proper relative position is not attained between the projecting end of the valve and the actuating end of the actuating device, a desired stroke of the valve will not be attained by operating the actuating device. It is possible to avert the aforesaid shortcomings by providing some adjusting devices in mounting the actuating device or the gas spring, but such adjusting devices are complicated in construction and expensive.

Usually a bracket is attached on the supported member for mounting the gas spring thereon, and thus it is possible to utilize the bracket for mounting the actuating device, but, the construction of the bracket is complicated and the length of the bracket is increased to mount the actuating deivce.

SUMMARY OF THE INVENTION

An object of the present invention is to provide a gas spring eliminating the aforementioned shortcomings with the actuating device being disposed in and supported by an extending portion which extends from one end of the main body of the gas spring. Preferably, the extending portion is formed integrally with a cylinder constituting the main body of the gas spring and the valve adjusting the overall length of the gas spring has a projecting end projecting from the one end of the gas spring for engaging with an actuating end of the actuating device.

BRIEF DESCRIPTION OF THE DRAWINGS

The present invention will now be further described with reference to the accompanying drawings, in which:

FIG. 1 is a longitudinal cross-sectional view of a gas spring according to the present invention;

FIG. 2a and FIG. 2b are side views showing the configuration of lateral openings formed respectively in the cylinder of FIG. 1 with a supporting member inserted therein; and FIG. 3 is a perspecitve view of the supporting member incorporated in the gas spring of FIG. 1.

DETAILED DESCRIPTION OF THE INVENTION

The gas spring shown in FIG. 1 comprises a cylinder 1 constituting the main body of the gas spring. A rod guide 2 is secured to the lower end of the cylinder 1. A cap member 3 secured to the cylinder 1 divides the interior of the cylinder 1 into an open space A and a closed space B. The closed space B forms a working chamber receiving gas and oil therein. A piston rod 4 is slidably guided by the rod guide 2 with one end thereof projecting outside of the cylinder 1, and is adapted to be secured to an element such as a base portion of a chair or the like (not shown in the drawing). A piston 5 secured to the other end (the upper end in the drawing) of the piston rod 4 works slidably in the cylinder 1. A partition wall 6 secured in the cylinder 1 divides the space B into an oil chamber $B_1$ and a chamber $B_2$ receiving gas and oil therein. A through hole 6a is formed in the central portion of the partition wall 6 with the lower end thereof having an enlarged diameter. A valve member 7 includes a stem portion 7a, a head portion 7b cooperating with the hole 6a to connect or disconnect the chamber $B_1$ with the chamber $B_2$, and a projecting end 7c projecting through the cap member 3 into the space A. The valve member 7 is slidably and sealingly supported by the cap member 3. In the embodiment shown in the drawing, the space A defined by upper portion 1b of the cylinder 1 has a circular cross-section and is tapered in the upward direction. The upper portion 1b of the cylinder 1 is adapted to be secured to an element such as a seat portion of a chair or the like by any suitable mounting device (not shown), and if desired, one or more mounting bolt receiving holes (not shown) may be provided. The upper end of the space A is open to the atmosphere in the embodiment shown, but a dust preventing cap or the like (not shown) may be provided. Diametrically opposite openings 8a and 8b are formed in the upper portion 1b adjacent to the cap member 3. The opening 8a has a generally rectangular configuration as shown in FIG. 2a and the opening 8b has a cross-like shape as shown in FIG. 2b. A supporting plate 9 having a configuration as shown in FIG. 3 is fitted in the openings 8a and 8b. The supporting plate 9 is preferably formed of a sheet of steel plate by bending so as to have a generally U-shaped configuration with the bottom end portion 9b being cut off by a portion thereof to form stepped portion 9a. The bottom end portion 9b is fitted in the opening 8a. Two leg portions 9c of the supporting member 9 extend parallel with each other, and the distal end portions 9d of the leg portions 9c are bent toward one another with the space therebetween being narrower than the space between respective remaining portions of the leg portions 9c. The supporting member 9 is inserted into the space A through the opening 8b with the bottom end portion 9b being fitted in the opening 8a, and with the step portions 9a abutting with the inner surface of the cylinder portion 1b to locate the supporting member with respect to the cylinder 1. In FIGS. 2a and 2b the bottom end portion 9b and the leg portion 9c are respectively shown in cross-section showing the fitting relationships. A clip 13 is inserted between the outer surface of the cylinder portion 1b and the inner surface of the bottom end portion 9b to retain the supporting member 9.

An actuating plate 11 is pivotally supported on a shaft 12 inserted through holes 10 formed in the end portions 9d of the supporting member 9. The plate 11 extends into the space A with an actuating end 11b for abutting with the projecting portion 7c of the valve 7. The plate 11 also extends outwardly of the gas spring with an operating knob or the like 11a of a suitable form attached thereto.

As heretofore described, the gas spring according to the present invention comprises a valve 7 selectively connecting two chambers $B_1$ and $B_2$ of working chamber B defined in a cylinder of the gas spring with one end (projecting end 7c) projecting outside of the chamber B, and an actuating plate 11 mounted on the cylinder with an actuating end 11b being adapted to engage with the projecting end 7c of the valve, therefore, it is possible to attain between the actuating end 11b of the actuating plate 11 and the projecting end 7c of the valve a desired positional relationship in the axial and radial directions. By attaining the axial positional relationship, it is possible to attain a desired stroke of the valve and to locate the actuating end 11b with a predetermined space from the projecting end 7c in the non-actuated condition thereby avoiding incidental actuation of the valve. By attaining the radial positional relationship, it is possible to align the actuating plate with respect to the valve thereby avoiding inclined or offset wear and also avoiding radial force induced in the valve stem. Therefore the overall length of the gas spring can be reliably adjusted.

Further, since the lower end of the bottom end portion 9b of the supporting member 9 is cut by a predetermined amount forming the stepped portion 9a, it is possible to avoid the projecting portion 7c of the valve 7 from contacting with the bottom end portion 9b of the supporting member 9 in inserting the supporting member 9 into the space A through openings 8b and 8a, and thus, the assembling operation can be easily performed.

Further, the supporting plate 9 and the acutating plate 11 are reliably mounted on the cylinder 1 by openings 8a, 8b, the stepped portion 9a, the shaft 12 and by the clip 13 at a desired position, and thus, operations such as welding or the like can be omitted.

The embodiment shown in the drawings includes the closed space or the working chamber B having a construction as illustrated, but it will be noted that the present invention may be applied widely to any type of gas spring provided that a projecting end 7c of a valve controlling the overall length of the gas spring projects into a space A defined by extending portion 1b of cylinder 1.

What is claimed is:

1. A gas spring comprising:

a cylinder having therein an upper open space and a lower closed space, said closed space having upper and lower closed ends, said closed space being filled by fluid including pressurized gas and liquid;

a piston slidably positioned in said closed space of said cylinder;

a portion rod connected to said piston and extending out of said closed space through said lower closed end;

valve means, positioned in said closed space, for controlling movement of said fluid within said closed space in response to movement of said piston in said closed space, and thereby controlling the volume of said pressurized gas in said closed space;

actuating element means, slidably extending through said upper closed end of said closed space into said open space, for actuating said valve;

said cylinder including a peripheral wall portion defining said upper open space, said peripheral wall portion having therethrough diametrically opposed openings;

a supporting member formed of a plate-like member bent into a substantially U-shaped configuration including a pair of spaced parallel arms and an end portion connecting said arms, a part of said end portion and parts of said arm adjacent said end portion being removed to form a step defined by first abutting surfaces extending substantially parallel to said arms and second abutting surfaces extending substantially transverse to said arms;

said supporting member being positioned to extend through said opposed openings in said peripheral wall portion of said cylinder, such that said arms extend in substantially vertical planes, such that said end portion of said supporting member extends through a first of said openings, with said first abutting surfaces contacting an edge of said peripheral wall portion which defines the bottom of said first opening, and with said second abutting surfaces contacting the inner surface of said peripheral wall portion, and such that the free end portions of said arms extend outwardly through a second of said openings;

an operating lever pivotally supported by said arms at a position exterior of said cylinder, said operating lever extending through said second opening into said open space, with an end of said operating lever being positioned above said actuating element means; and clip means, removably positioned between said end portion of said supporting member and the outer surface of said peripheral wall portion of said cylinder, for positioning and retaining said supporting member within said openings of said peripheral wall portion of said cylinder.

* * * * *